United States Patent
Nishino et al.

(10) Patent No.: US 10,358,064 B2
(45) Date of Patent: Jul. 23, 2019

(54) HEADREST COVER

(71) Applicants: TACHI-S CO., LTD., Tokyo (JP); HONDA MOTOR CO., LTD., Tokyo (JP)

(72) Inventors: Yoshihiko Nishino, Tokyo (JP); Ryo Kurobe, Tokyo (JP); Tomoyuki Uemura, Saitama (JP); Taku Nagasawa, Saitama (JP); Tomoyo Futakawame, Saitama (JP); Shinobu Sasaki, Saitama (JP)

(73) Assignees: Tachi-S Co., Ltd., Tokyo (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/621,154

(22) Filed: Jun. 13, 2017

(65) Prior Publication Data

US 2017/0361739 A1 Dec. 21, 2017

(30) Foreign Application Priority Data

Jun. 17, 2016 (JP) ................... 2016-120769

(51) Int. Cl.
*B60N 2/60* (2006.01)
*B60N 2/80* (2018.01)

(52) U.S. Cl.
CPC .............. *B60N 2/60* (2013.01); *B60N 2/6018* (2013.01); *B60N 2/6036* (2013.01); *B60N 2/80* (2018.02)

(58) Field of Classification Search
CPC .......... B60N 2/48; B60N 2/60; B60N 2/6018; B60N 2/6036; B60N 2/80

USPC ............................................ 297/220, DIG. 6
See application file for complete search history.

(56) References Cited

U.S. PATENT DOCUMENTS

| 4,003,599 A * | 1/1977 | Takamatsu | B60N 2/48 297/220 |
| 4,848,836 A * | 7/1989 | Masui | B60N 2/48 297/220 |
| 5,139,310 A * | 8/1992 | Itoh | B60N 2/4876 297/220 X |
| 8,191,967 B2 * | 6/2012 | Chen | A47C 7/383 297/DIG. 6X |
| 9,578,952 B1 * | 2/2017 | Wray | A45F 3/04 |
| 2009/0160230 A1 | 6/2009 | Yasuda | |

FOREIGN PATENT DOCUMENTS

| CN | 1943478 A | 4/2007 |
| FR | 2911820 A | 8/2008 |
| JP | S51-095128 U | 7/1976 |
| JP | H03-129354 U | 12/1991 |
| JP | H05-004949 U | 1/1993 |
| JP | H11-078700 A | 3/1999 |
| JP | 2009-153560 A | 7/2009 |
| JP | 3188535 U | 1/2014 |
| JP | 2016-097948 A | 5/2016 |

* cited by examiner

*Primary Examiner* — Anthony D Barfield
(74) *Attorney, Agent, or Firm* — Morgan, Lewis & Bockius LLP (57) ABSTRACT

A changeable cover for a seat headrest comprises: a first locking part for locking a portion of the cover with a stay of the headrest; and a second locking part for locking another portion of the cover with the headrest. The first locking part may be, for example, a through-hole into which the stay is inserted. The second locking part may be, for example, a hook-and-loop fastener member.

4 Claims, 8 Drawing Sheets

HEADREST COVER

CROSS-REFERENCES TO RELATED APPLICATIONS

This application relates to and claims priority from Japanese Patent Application No. JP2016-120769, filed on Jun. 17, 2016, the entire disclosure of which is incorporated herein by reference.

BACKGROUND

Field

The present invention relates to a cover used for a headrest.

Description of Related Art

Vehicle seats are typically comprised of, for example, a foam material cushion member and a trim cover that covers the cushion member. Seats which are further provided with a wadding member and a detachable seat cover (changeable cover) that can be changed based on the users' preferences are also available (see, for example, JP2009-153560 A).

Figure 12:
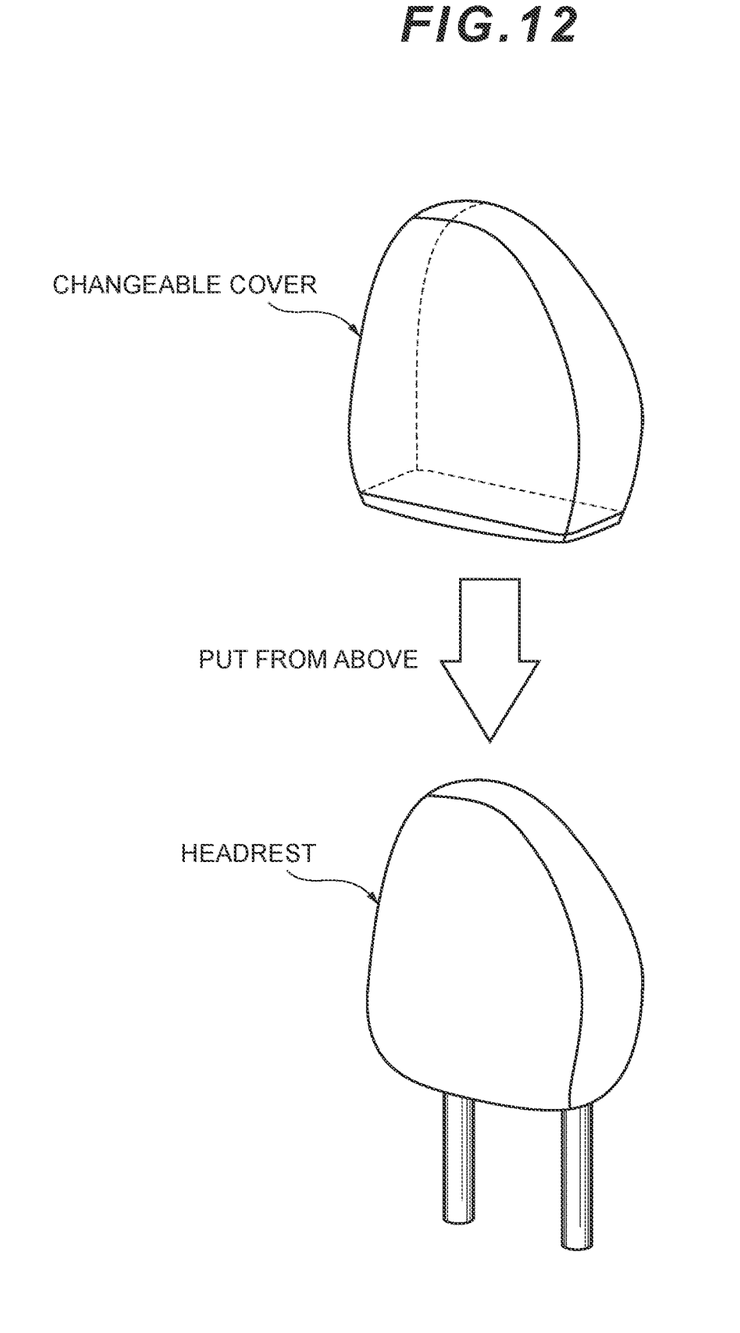
FIG. 12 is a perspective illustration showing an example of the conventional cover for reference.

For the headrests of seats, a changeable cover having a bag-like shape so as to be fitted to enclose the headrest is also used (see FIG. 12).

SUMMARY

However, such a changeable cover designed in a bag-like shape to enclose the headrest is sometimes unable to be held on the headrest in a stable orientation; for example, the cover itself may turn as the head of the seated person is continuously coming into contact with the cover. Furthermore, some bag-like covers are tight or not smooth, thereby making it difficult to put them on the headrest, and such covers may be unable to be fitted stably with the headrest. Similarly, some bag-like covers are difficult to remove from the headrest and they may need to be separated from the headrest by force. Moreover, the front and back of the bag-like cover are not easy to distinguish, which is inconvenient when the user wants to put the cover on the headrest.

An object of the present invention is to provide a headrest cover that is easy to be attached to and detached from a headrest and that can be fitted at an accurate position on the headrest.

In order to achieve the above object, the present invention provides a changeable cover for a seat headrest, comprising: a first locking part that locks a portion of the cover with a stay of the headrest; and a second locking part that locks another portion of the cover with the headrest.

The above headrest cover is preferably fitted in a manner so as to at least partly cover the headrest.

The first locking part may be a through-hole into which the stay is inserted.

The periphery of the through-hole may be reinforced.

The first locking part may be a cutout that removably engages with the stay.

The periphery of the cutout may be reinforced.

The second locking part may be a hook-and-loop fastener member.

The second locking part may be a covering part which is to be fitted onto a portion of the headrest.

DETAILED DESCRIPTION

Hereinafter, a cover for a seat headrest according to the embodiments of the present invention will be more specifically described, with reference to the attached drawings (FIGS. 1-11). The embodiments given below describe, by way of example, the cases where the present invention is applied to a vehicle seat 1.

Figure 1:
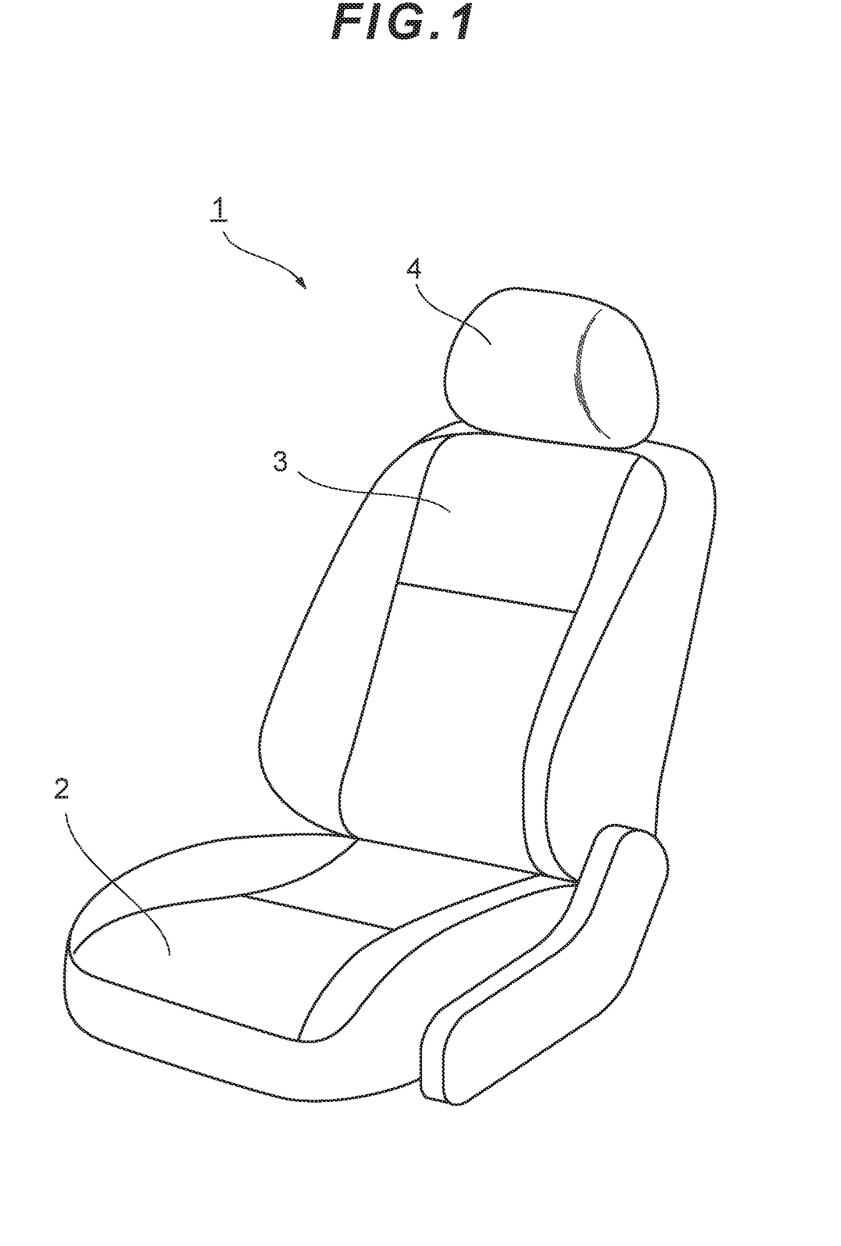
FIG. 1 is a perspective illustration showing an example of a seat with a headrest.

The seat 1 has: a seating part 2 which is movable back and forth on the floor panel of the vehicle; a reclining seat back 3 with respect to the seating part 2; and a headrest 4 attached to the top of the seat back 3. The seating part 2, seat back 3 and headrest 4 are seat components that constitute the seat 1 and each component includes a cushion member made of a foam material (not shown in the drawing). The seat back 3 is provided with a supporting member (not shown in the drawing) for supporting the headrest 4.

The headrest 4 has typically two stays 41 provided at a lower part of the headrest 4 (see FIG. 2, etc.), and is supported with the stays 41 inserted into the supporting member of the seat back 3. A removable cover (hereinafter, also referred to as a changeable cover) 10 is fitted on the headrest 4.

The changeable cover 10 is fitted on the headrest 4 so as to at least partly cover a front face (a side facing forward, i.e., a side on which the head of the seated person is supported) of the headrest 4. Accordingly, the changeable cover 10, when fitted on the headrest 4, is in such a state that the cover 10 is, at least in part, sandwiched by the headrest 4 and the head of the person seated on the seat 1.

The changeable cover 10 has a first locking part for locking a portion of the changeable cover 10 with the stay 41 of the headrest 4 and a second locking part for locking another portion of the changeable cover 10 with the headrest 4. The changeable cover 10 is configured so as to be easily attachable/detachable to/from the headrest 4. Now, with the use of the first to fourth embodiments given below, the specific configuration of the changeable cover 10 will be described along with the description of the specific forms of the first and second locking parts (see FIG. 2, etc.).

First Embodiment

Figure 2:
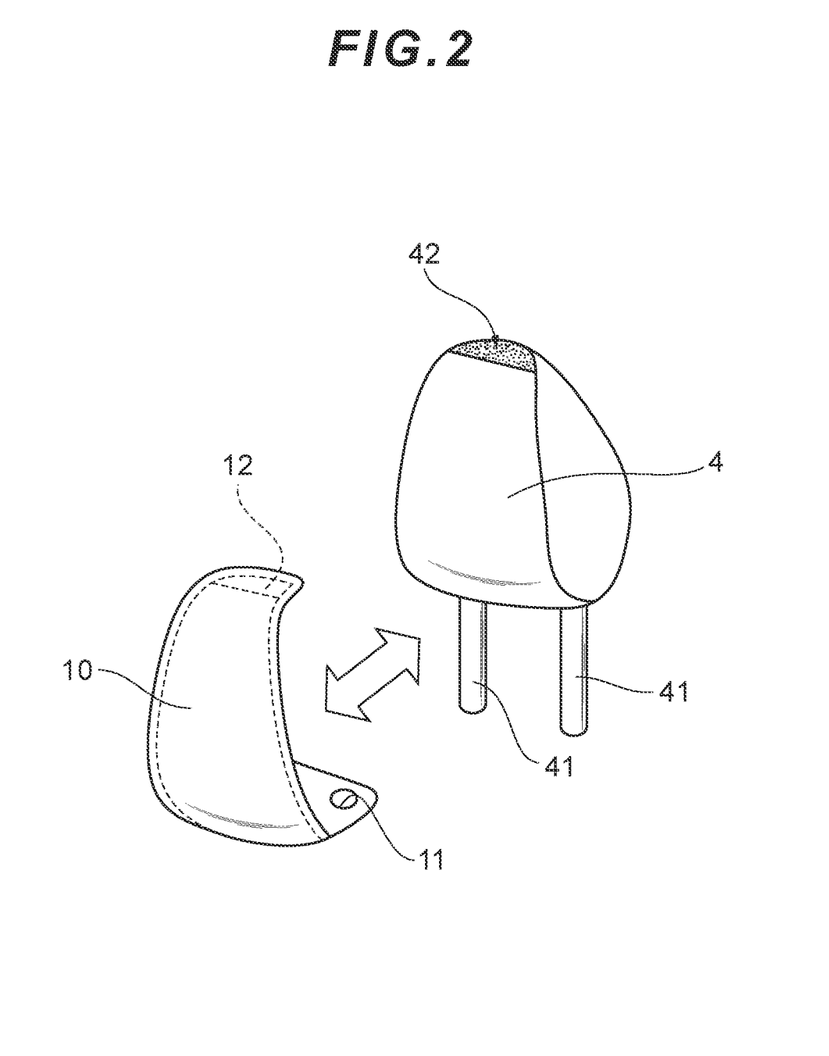
FIG. 2 is a perspective view of a headrest and a cover before being fitted on the headrest according to a first embodiment of the present invention.
Figure 3:
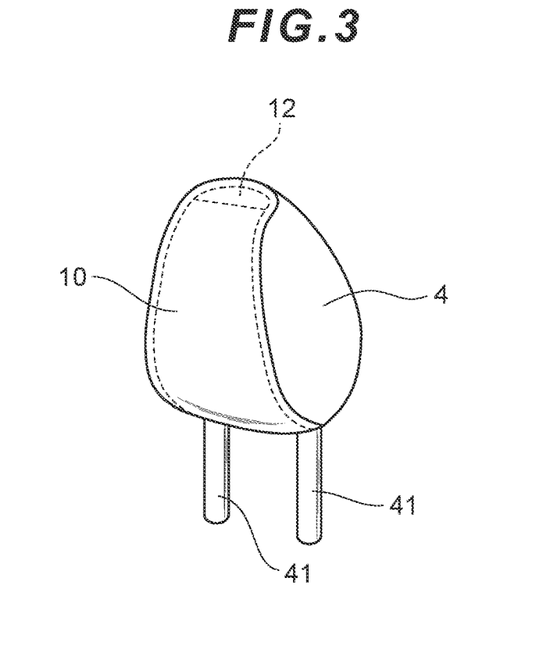
FIG. 3 is a perspective illustration showing a headrest with a cover fitted on the headrest.
Figure 4:
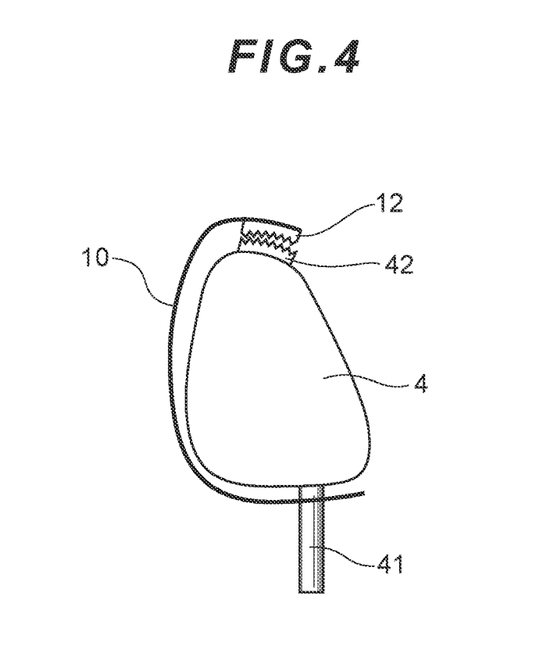
FIG. 4 is a side view of the headrest and cover in FIG. 3.

The changeable cover 10 of this embodiment has a through-hole 11 and a hook-and-loop fastener member 12 (see FIGS. 2-4).

The through-hole 11 is a hole provided at a position that enables the stay 41 to be inserted therethrough (see FIG. 2). In this embodiment, the right and left through-holes 11, i.e., two holes in total, are formed according to the positions of the stays 41. Although a detailed description thereof will be omitted, the through-hole 11 is designed to ensure the necessary strength by, for example, attaching a resin ring in its periphery or by applying reinforcing stitches around the hole.

The hook-and-loop fastener member 12 is provided on a side of the changeable cover 10 where no through-holes 11 are formed, so as to lock a portion of the changeable cover 10 with the headrest 4 (see FIG. 4, etc.). Another hook-and-loop fastener member 42 that engages and disengages with the hook-and-loop fastener member 12 is provided on the surface of the headrest 4 at a position corresponding to the hook-and-loop fastener member 12 of the changeable cover 10 (see FIG. 2, etc.). The hook-and-loop fastener member 12 having hooks (or loops) and the hook-and-loop fastener member 42 having loops (or hooks) together constitute a hook-and-loop fastener.

The changeable cover 10 having the above configuration can be fitted on the headrest 4 by the steps of passing each stay 41 through the through-hole 11 until the bottom of the stay 41 is reached, placing the changeable cover 10 on the headrest 4 so as to wind around the front face of the headrest 4, and then adhering the hook-and-loop fastener member 12 to the corresponding hook-and-loop member 42 of the headrest 4 while applying certain tension to the cover 10 (see FIGS. 3 and 4).

Second Embodiment

Figure 5:
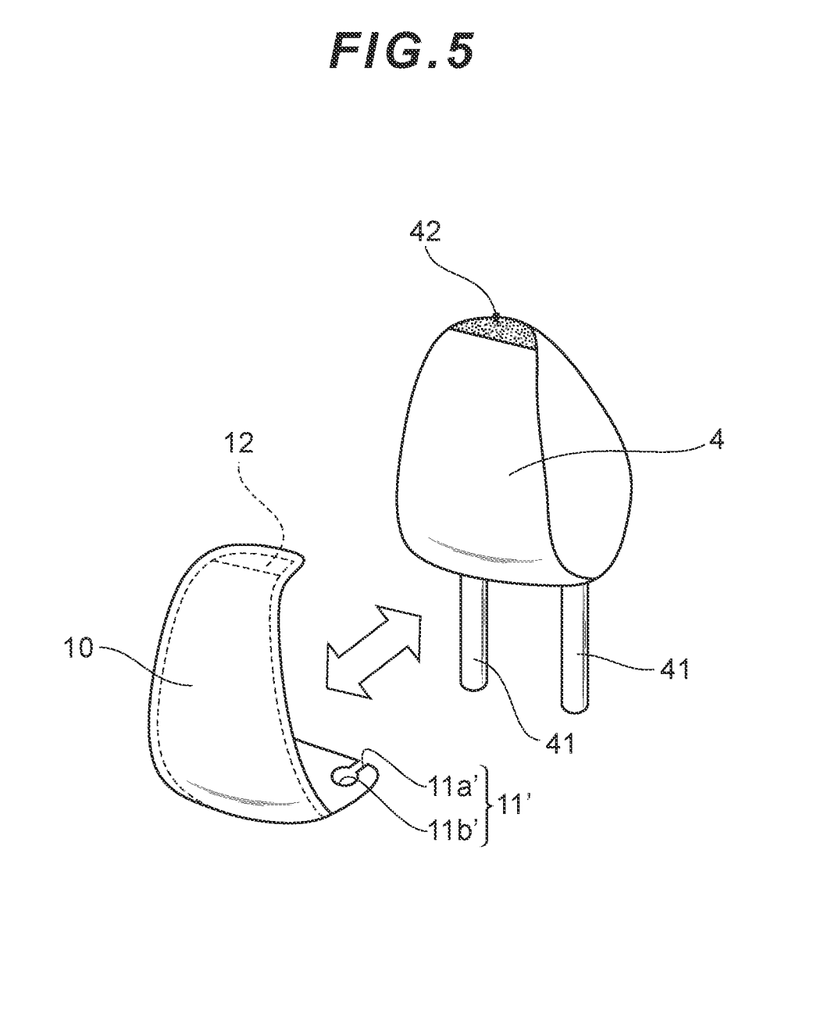
FIG. 5 is a perspective view of a headrest and a cover before being fitted on the headrest according to a second embodiment of the present invention.
Figure 6:
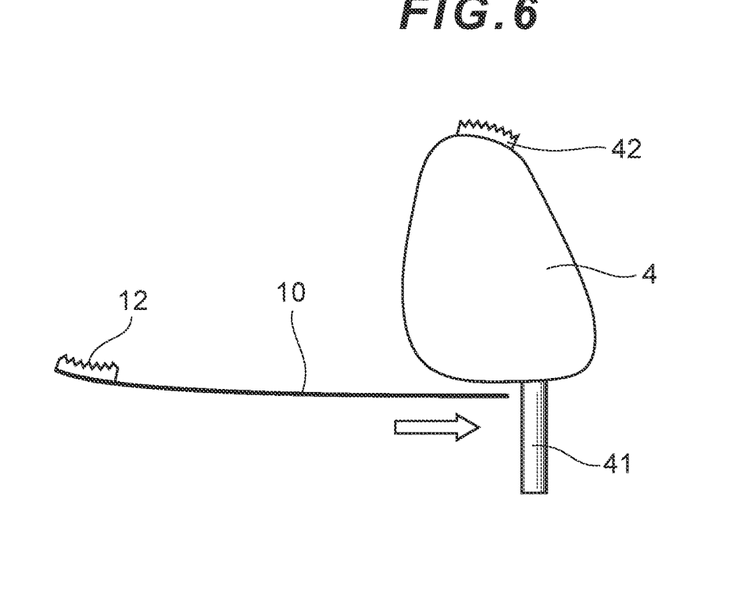
FIG. 6 is a side view of a headrest and a cover in the process of locking the cover with a stay of the headrest.
Figure 7:
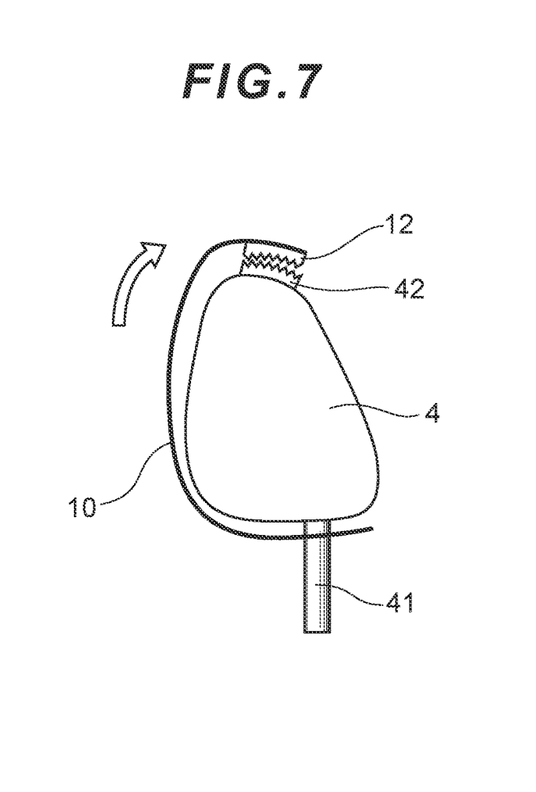
FIG. 7 is a side view of a headrest with a cover fitted on the headrest.

The changeable cover 10 of this embodiment has a cutout 11' and a hook-and-loop fastener member 12 (see FIGS. 5-7).

The cutout 11' includes: a narrowed section 11a' which is formed at an end of the changeable cover 10 and is narrower than the outer diameter of the stay 41; and a circular section 11b which continues to the narrowed section 11a' on a side away from the end of the changeable cover 10 (see FIG. 5). The circular section 11b' may be provided with, for example, a snap ring or a C-shaped stop ring, as required, so as to impart necessary strength. The narrowed section 11a' has elasticity and strength sufficient to permit the stay 41, when it is pressed into the narrowed section 11a', to pass therethrough toward the circular section 11b' and to further prevent such stay 41 from slipping out of the circular section 11b'. In this embodiment, the right and left cutouts 11', i.e., two cutouts in total, are formed according to the positions of the stays 41.

The hook-and-loop fastener member 12 is provided on a side of the changeable cover 10 where no cutouts 11' are formed, so as to lock a portion of the changeable cover 10 with the headrest 4 (see FIG. 5, etc.). Another hook-and-loop fastener member 42 that engages and disengages with the hook-and-loop fastener member 12 is provided on the surface of the headrest 4 at a position corresponding to the hook-and-loop fastener member 12 of the changeable cover 10 (see FIG. 7, etc.). The hook-and-loop fastener member 12 having hooks (or loops) and the hook-and-loop fastener member 42 having loops (or hooks) together constitute a hook-and-loop fastener.

The changeable cover 10 having the above configuration can be fitted on the headrest 4 by the steps of pressing each stay 41 into the cutout 11' (see FIG. 6), placing the changeable cover 10 on the headrest 4 so as to wind around the front face of the headrest 4, and then adhering the hook-and-loop fastener member 12 to the corresponding hook-and-loop fastener member 42 of the headrest 4 while applying desired tension to the cover 10 (see FIG. 7).

Third Embodiment

Figure 8:
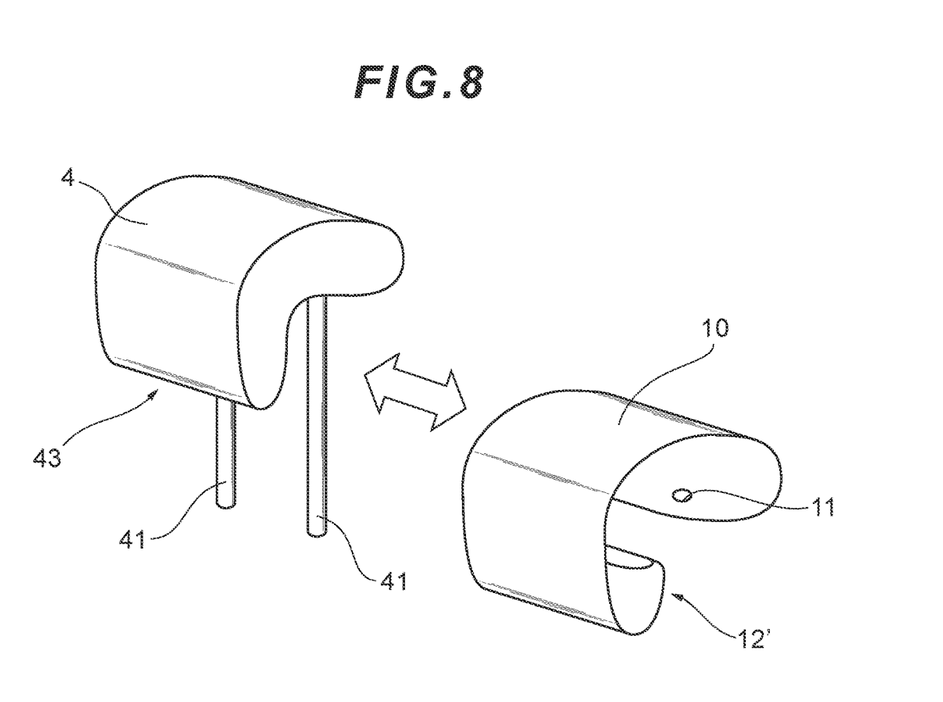
FIG. 8 is a perspective view of a headrest and a cover before being fitted on the headrest according to a third embodiment of the present invention.
Figure 9:
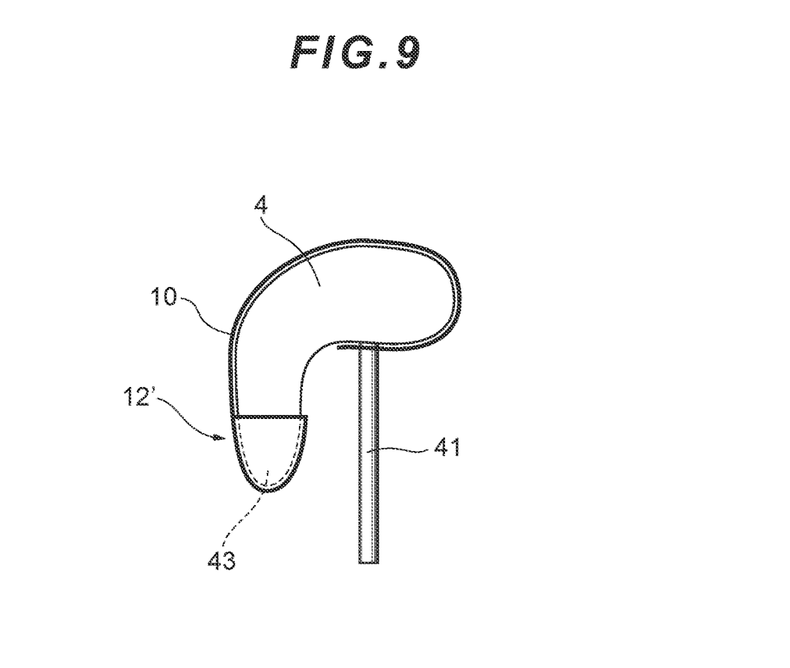
FIG. 9 is a side view of a headrest with a cover fitted on the headrest.

The changeable cover 10 of this embodiment has a through-hole 11 and a covering part 12' which is to be fitted onto a portion of the headrest 4 (see FIGS. 8 and 9).

It should be noted here that this embodiment and the fourth embodiment, which will be described below, describe the case where the cover of the present invention is applied to a headrest 4 particularly suited for a rear seat of a vehicle. Such headrest 4 has a shape gradually bending downward at a point in the back-and-forth direction. The headrest 4 is formed to appropriately fit with the upper edge of a bench-type rear seat, and has a reduced height while ensuring a sufficient face to support the head of the seated person.

The through-hole 11 is a hole provided at a position that enables the stay 41 to be inserted therethrough (see FIG. 8). In this embodiment, the right and left through-holes 11, i.e., two holes in total, are formed according to the positions of the stays 41. Although a detailed description thereof will be omitted, the through-hole 11 is designed to ensure the necessary strength by, for example, attaching a resin ring in its periphery or by applying reinforcing stitches around the hole.

The covering part 12' is a bag-like or pocket-like part provided on a side of the changeable cover 10 where no through-holes 11 are formed, with the size and shape that match with the size and shape of the lower end portion 43 of the front face of the headrest 4. When such covering part 12' is put on the lower end portion 43 of the front face of the headrest 4, the covering part 12' holds the changeable cover 10 to be fitted on the headrest 4 with certain tension applied to the changeable cover 10 (see FIG. 9).

The changeable cover 10 having the above configuration can be fitted on the headrest 4 by the steps of passing each stay 41 through the through-hole 11 until the bottom of the stay 41 is reached, placing the changeable cover 10 on the headrest 4 from the back to the front so as to wind around the front face of the headrest 4, and then fitting the covering part 12' onto the lower end portion 43 of the front face of the headrest 4 while applying certain tension to the cover 10 (see FIG. 9).

Fourth Embodiment

Figure 10:
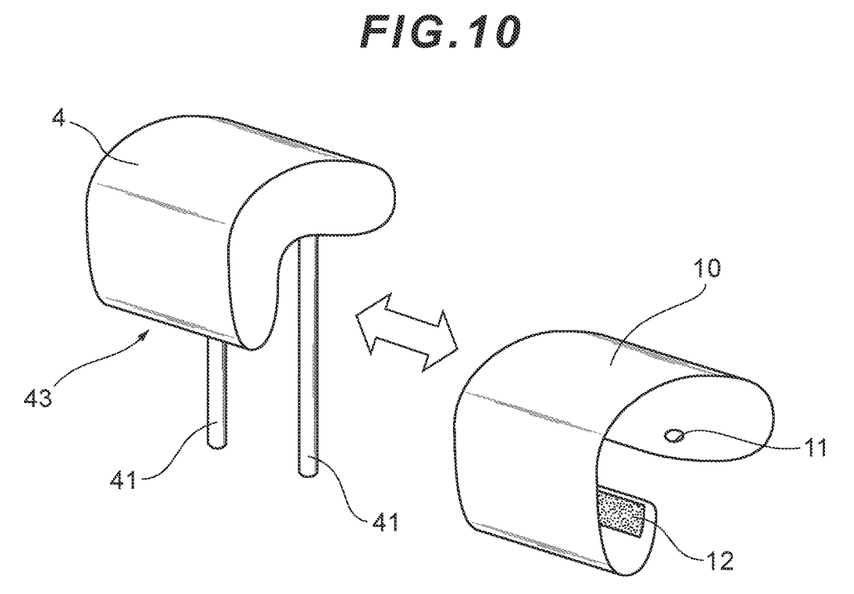
FIG. 10 is a perspective view of a headrest and a cover before being fitted on the headrest according to a fourth embodiment of the present invention.
Figure 11:
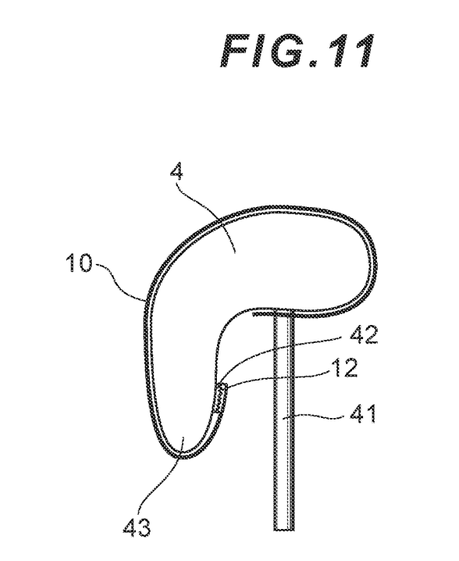
FIG. 11 is a side view of a headrest with a cover fitted on the headrest.

The changeable cover 10 of this embodiment has a through-hole 11 and a hook-and-loop fastener member 12 (see FIGS. 10 and 11).

The through-hole 11 is a hole provided at a position that enables the stay 41 to be inserted therethrough (see FIG. 10). In this embodiment, the right and left through-holes 11, i.e., two holes in total, are formed according to the positions of the stays 41. Although a detailed description thereof will be omitted, the through-hole 11 is designed to ensure the necessary strength by, for example, attaching a resin ring in its periphery or by applying reinforcing stitches around the hole.

The hook-and-loop fastener member 12 is provided on a side of the changeable cover 10 where no through-holes 11 are formed, so as to lock a portion of the changeable cover 10 with the headrest 4 (see FIGS. 10 and 11). Another hook-and-loop fastener member 42 that engages and disengages with the hook-and-loop fastener member 12 is provided on the surface of the headrest 4 at a position corresponding to the hook-and-loop fastener member 12 of the changeable cover 10, for example, at the back side of the lower portion of the front face (see FIG. 11). The hook-and-loop fastener member 12 having hooks (or loops) and the hook-and-loop fastener member 42 having loops (or hooks) together constitute a hook-and-loop fastener.

The changeable cover 10 having the above configuration can be fitted on the headrest 4 by the steps of passing each stay 41 through the through-hole 11 until the bottom of the stay 41 is reached, placing the changeable cover 10 on the headrest 4 from the back to the front so as to wind around the front face of the headrest 4, and then adhering the hook-and-loop fastener member 12 to the corresponding hook-and-loop member 42 of the headrest 4 while applying certain tension to the cover (see FIG. 11).

As described in each of the embodiments above, the changeable cover 10 according to the embodiments of the present invention can easily be fitted on the headrest 4 by fixing a portion of the changeable cover 10 with the stay 41, and can eliminate difficulties or inconveniences associated with the fitting of a conventional bag-like cover. Furthermore, the changeable cover 10 can be removed from the headrest 4 by reversing the steps for fitting the cover, i.e., the cover 10 can be removed simply by separating the hook-and-loop fastener member 12 from the hook-and-loop fastener member 42 of the headrest 4 (or detaching the covering part 12 from the lower end portion 43 of the front face) and pulling the stay 41 out of the through-hole 11 (or removing the stay 41 from the cutout 11'). Similarly to the fitting steps, the steps for removal are also easy to perform.

Furthermore, the changeable cover 10 is configured to be fitted at a specific position which is defined by the two through-holes 11 (or cutouts 11') and the hook-and-loop fastener member 12 (or covering part 12') and, in addition, the fitted cover 10 is less likely to be displaced or put in an unstable orientation.

The above-described embodiments are preferred embodiments of the present invention, but the present invention is not limited to those embodiments and may be modified in various ways without departing from the gist of the present invention. For example, the above-mentioned embodiments describe the case where the seat 1 is a vehicle seat; however, this is just a preferred example and the present invention can also be applied to the headrest of a variety of seats, including seats for various vehicles (e.g., seats for airplanes and seats for ships) and seats other than vehicle seats (e.g., chairs and sofas as furniture, including office furniture).

Moreover, in the above-described embodiments, a bag-like covering part 12' which is to be fitted onto a portion (specifically, the lower end portion 43 of the front face) of the headrest 4 is mentioned as an example of the second locking part, but this is also just a preferred example, and the cover of the present invention may also be configured to be fitted onto on a given portion of the headrest 4 by means of a variety of fastening members, such as hooks, pins, and the like.

The materials used for the changeable cover 10 have not specifically been mentioned in the above-described embodiments, and such materials are not limited as long as they exhibit necessary functions as the changeable cover 10.

The present invention is suited for use in a changeable cover for a seat headrest.

What is claimed is:

1. A headrest cover, comprising:
   a first locking part configured to lock a portion of the headrest cover with a stay of a headrest, the first locking part comprising a through-hole into which the stay is inserted and a reinforcing member which is attached to a periphery of the through-hole; and
   a second locking part configured to lock another portion of the headrest cover with the headrest, the second locking part comprising a bag-like or pocket-like covering part which is configured to fit on a portion of the headrest and which is put on the portion of the headrest,
   wherein the second locking part is fitted on a portion of the headrest with a certain tension applied to the cover, and covers a part of a side of the headrest,
   wherein the first and second locking parts are arranged such that, when the first locking part locks a portion of the headrest cover with the stay of the headrest and the second locking part locks the other portion of the headrest cover with the headrest, they are separated from each other,
   wherein the headrest cover is configured to be attached to and detached from the headrest, and the headrest is a part of a seat for a vehicle.

2. The headrest cover according to claim 1, wherein the reinforcing member is a resin ring.

3. The headrest cover according to claim 2, wherein the cover is fitted on the headrest so as to at least partly cover a front face of the headrest.

4. A headrest cover, comprising:
   a first locking part configured to lock a portion of the headrest cover with a stay of a headrest, the first locking part comprising a through-hole into which the stay is inserted and a reinforcing member which is attached to a periphery of the through-hole; and
   a second locking part configured to lock another portion of the headrest cover with the headrest, the second locking part comprising a bag-like or pocket-like covering part which is configured to fit on a portion of the headrest and which is put on the portion of the headrest,
   wherein the second locking part is fitted on a portion of the headrest with a certain tension applied to the cover, and covers a part of a side of the headrest,
   wherein the second locking part is configured to cover a portion of the headrest on both a front and rear side,
   wherein the headrest cover is configured to be attached to and detached from the headrest, the headrest is a part of a seat for a vehicle, and
   wherein the second locking part does not include a zipper or sliding clasp fastener.

\* \* \* \* \*